United States Patent [19]

Nishimura et al.

[11] 4,265,482

[45] May 5, 1981

[54] HEAD-REST ADJUSTING DEVICE

[75] Inventors: Shinichi Nishimura, Yokohama; Satoshi Izumida, Koshigaya, both of Japan

[73] Assignees: Nissan Motor Co. Ltd.; Ikeda Bussan Co. Ltd., both of Yokohama, Japan

[21] Appl. No.: 63,368

[22] Filed: Aug. 3, 1979

[30] Foreign Application Priority Data

Aug. 23, 1978 [JP] Japan ............................ 53/116078[U]

[51] Int. Cl.³ ........................... A47C 1/10; A47C 7/12; A47C 7/36
[52] U.S. Cl. .................................... 297/391; 297/407; 297/409
[58] Field of Search ............... 297/391, 393, 403, 406, 297/407, 429, 400, 402, 409; 248/118, 118.5

[56] References Cited

U.S. PATENT DOCUMENTS

| 1,869,765 | 8/1932 | Mitchell | 297/391 |
| 3,393,938 | 7/1968 | Meyer et al. | 248/118 X |
| 3,851,919 | 12/1974 | Nagy | 248/118 X |
| 4,191,422 | 3/1980 | Inasawa et al. | 297/391 |

FOREIGN PATENT DOCUMENTS 2008937  8/1978  United Kingdom ...................... 297/391

Primary Examiner—James T. McCall
Attorney, Agent, or Firm—Schwartz, Jeffery, Schwaab, Mack, Blumenthal & Koch

[57] ABSTRACT

A device for forwardly and backwardly adjusting a head-rest according to the invention comprises a base plate fixed to stays extending above a back of a seat for an automobile and provided at its ends with lower rails formed with anchoring apertures, a slide formed on its upper surface with guides and on both sides with upper rails to be fitted with the lower rails, a flat plate-like locking lever traversely slidable within the guide of the slide and having a pair of anchoring pieces extending downwardly to engage in the anchoring apertures of the lower rails, a spring for urging the locking lever in one direction, and a cover for covering the base plate and the slide. With this arrangement, the position of the head-rest can be slidably adjusted by pushing the locking lever against the resilient force of the spring, and the head-rest can then be fixed at a desired position by releasing the locking lever.

8 Claims, 3 Drawing Figures

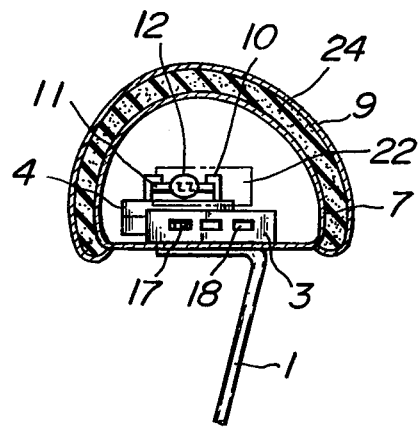
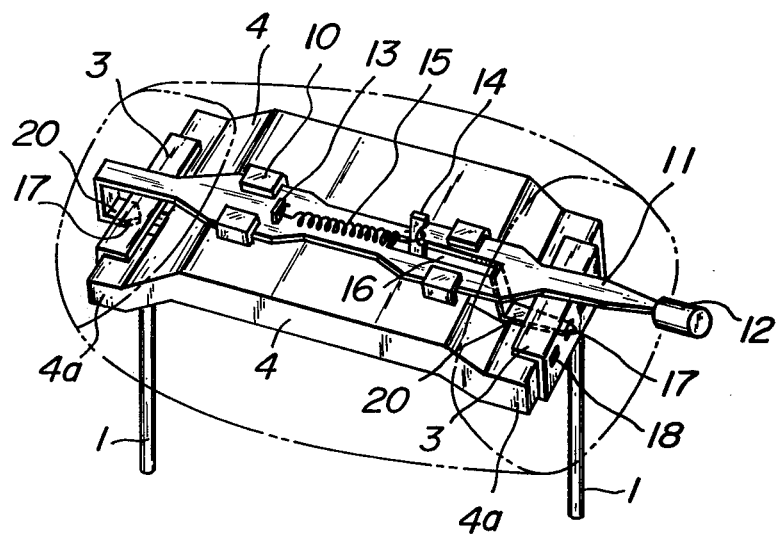

HEAD-REST ADJUSTING DEVICE

BACKGROUND OF THE INVENTION

1. Field of the Invention

The present invention relates to a head-rest mounted on a back of a seat of a vehicle and more particularly to a head-rest adjusting device for forwardly and backwardly adjusting a head-rest.

2. Description of the Prior Art

Various kinds of devices for adjusting head-rests have been suggested. However, these devices of the prior art are generally complicated in construction and operation and include parts to be machined with a high accuracy which may be expensive to manufacture. Accordingly, a device for adjusting a head-rest without such disadvantages has been desired for many years.

SUMMARY OF THE INVENTION

It is therefore an object of the invention to provide an improved head-rest adjusting device which eliminates the above described disadvantages of the prior art and is positive and easy in operation and inexpensive to manufacture without requiring a high accuracy in machining parts.

In order to achieve the object, the head-rest adjusting device according to the invention comprises a base plate fixed to stays extending above a back of a seat and provided at its ends with lower rails in the form of channels including anchoring apertures, a slide formed on its upper surface with guides and on both sides with upper rails to be fitted with said lower rails, a flat plate-like locking lever traversely slidable within said guides of said slide and having a pair of anchoring pieces extending downwardly to engage in said anchoring apertures, a spring for urging said locking lever in one direction, and a cover for covering said base plate and said slide.

In a preferred embodiment of the invention, the locking lever is made in a flat plate-like lever to obtain a good stability of sliding movement thereof and a pair of latches provided on the locking lever are beveled or pointed to facilitate the engagement with the anchoring apertures of the lower rails, so that the locking of the head-rest becomes easier and more positive without requiring any higher accuracy in machining parts.

The invention will be more fully understood by referring to the following detailed specification and claims taken in connection with the appended drawings.

BRIEF DESCRIPTION OF THE DRAWINGS

FIG. 1 is a sectional view of one embodiment of the device according to the invention;

FIG. 2 is a perspective view of a main part of the device shown in FIG. 1; and

DETAILED DESCRIPTION OF THE PREFERRED EMBODIMENT

Figure 3:
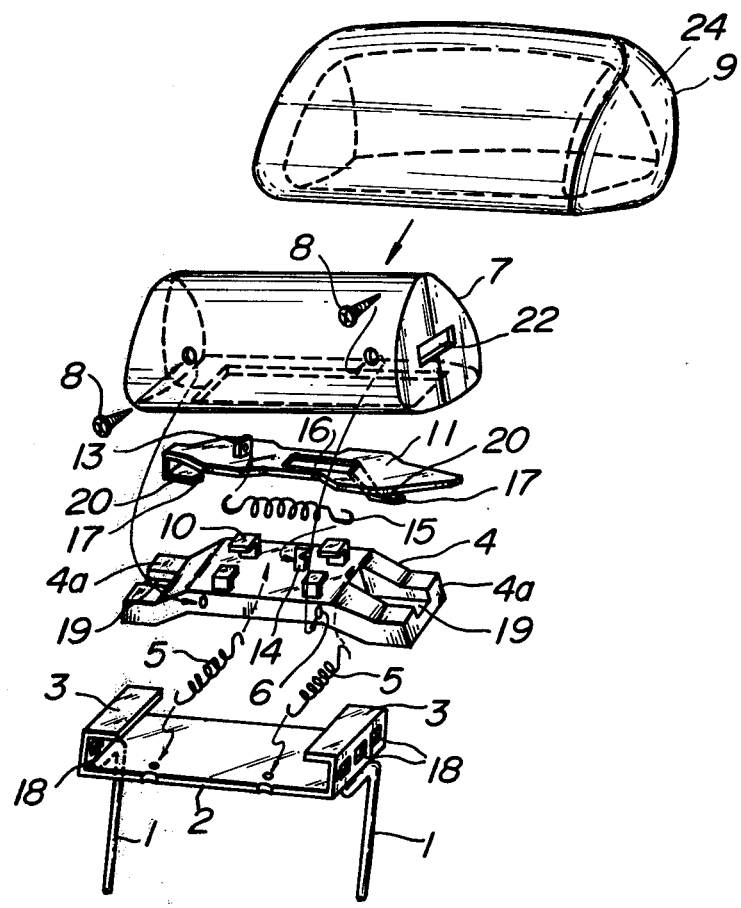
FIG. 3 is an exploded perspective view of the device according to the invention.

Referring to FIGS. 1–3 illustrating a preferred embodiment of the present invention, an underside of a base plate 2 is fixed to upper ends of a pair of stays 1 extending above a back of a seat. Both ends of the base plate 2 are bent upwardly and further bent inwardly into channel shapes to form lower rails 3 within which are forwardly and backwardly slidably fitted upper rails 4a of a slide 4 having a raised portion at its center. Springs 5 whose ends are connected to a forward end of the base plate 2 and a rearward end of the slide 4 are provided to normally urge the upper rails 4a of the slide 4 forwardly resiliently. The slide 4 is formed in forward and rearward faces with threaded apertures 6. Tapping screws 8 are screwed into the threaded apertures 6 and corresponding apertures of a head-rest cover 7 covering the slide 4 to fix the former to the latter. A head-rest pad 9 is further fitted on the head-rest cover 7.

As shown in FIGS. 2 and 3, the slide 4 is provided on its upper surface with inverted L-shaped guides 10 between which is traversely movably fitted a flat plate-like locking lever provided on its one end with an operating knob 12. The locking lever 11 is formed on its upper surface with a hook 13 to which is connected one end of a spring 15 and the slide 4 is provided on its upper surface with an upstanding hook 14 to which is connected the other end of the spring 15 to normally urge the locking lever 11 resiliently toward the right as viewed in FIG. 2. The locking lever 11 is also formed with an elongated hole 16 through which upwardly extends the hook 14 formed on the slide 4.

The locking lever 11 is further formed on its underside with a pair of anchoring pieces 20 aligned with each other longitudinally of the lever and having near at the ends respective latches 17 sharpened or pointed in triangles and facing to the right as viewed in FIGS. 2 and 3. The ends of the latches may be beveled instead of the triangular peaked ends. The lower rails 3 are formed in their side surfaces with a plurality of rectangular apertures 18 within which are engagingly received the latches 17 of the anchoring pieces 20. In addition, the slide 4 is formed in upper surfaces of the ends with guide grooves 19 for the latches 17 of the locking lever 11. The head-rest cover 7 is of course formed with an opening 22 through which extends the one end of the locking lever 11. The head-rest pad 9 comprises a pad 24.

The adjusting device above described operates as follows.

The locking lever 11 is normally resiliently urged by the spring 15 toward the right as viewed in FIG. 2 while the latches 17 engage in respective ones of the rectangular apertures 18. When it is desired to adjust the position of the head-rest forwardly and backwardly, the locking lever 11 is urged by the knob 12 against the resilient force of the spring 15 toward the left as viewed in FIG. 2 to remove the latches 17 of the anchoring pieces 20 from the rectangular apertures 18, thereby enabling the head-rest to slide forwardly and backwardly including the slide 4, the head-rest cover 7 provided thereon and the head-rest pad 9 thereon while being forwardly urged by the resilient forces of the springs 5. Accordingly, a driver or passenger urges backwardly the head-rest with his head against the resilient forces of the springs 5 and releases the locking lever 11 at a suitable position of the head-rest, so that the locking lever 11 moves by the force of the spring 15 toward the right as viewed in the drawing to cause the latches 17 to engage in the other rectangular apertures 18, whereby the head-rest is fixed at the suitable position.

In this manner, according to the invention, the position of the head-rest can be easily adjusted forwardly and backwardly by pushing and releasing the locking lever. The adjusting device according to the invention ensures positive sliding and engaging movements of the locking lever and is inexpensive to manufacture without requiring any high accuracy in working parts.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A head-rest adjusting device comprising a base plate fixed to stays extending above a back of a seat and provided at its ends with lower rails in the form of channels including anchoring apertures, a slide formed on its upper surface with guides and on both sides with upper rails to be fitted with said lower rails, a flat plate-like locking lever traversely slidable within said guides of said slide and having a pair of anchoring pieces extending downwardly to engage in said anchoring apertures, a spring for urging said locking lever in one direction, and a cover for covering said base plate and said slide.

2. A head-rest adjusting device as set forth in claim 1, wherein both ends of a plate are bent upwardly and further bent inwardly into channel shapes to form said base plate including said lower rails, and the upwardly bent portions are formed with rectangular apertures as said anchoring apertures.

3. A head-rest adjusting device as set forth in claim 1, wherein said upper rails of said slide are normally urged forwardly relative to said base plate by means of springs whose ends are connected to a forward end of said base plate and a rearward end of said slide.

4. A head-rest adjusting device as set forth in claim 1, wherein said guides on said slide are inverted L-shaped guides.

5. A head-rest adjusting device as set forth in claim 1, wherein said locking lever is formed on its upper surface with a hook to which is connected one end of said spring for urging said locking lever and the other end of said spring is connected to a hook upstandingly provided on an upper surface of said slide and extending through an elongated hole formed in said locking lever.

6. A head-rest adjusting device as set forth in claim 1, wherein ends of said anchoring pieces to be engaged in said anchoring apertures are beveled.

7. A head-rest adjusting device as set forth in claim 1, wherein ends of said anchoring pieces to be engaged in said anchoring apertures are sharpened.

8. A head-rest adjusting device as set forth in claim 1, wherein said anchoring pieces are formed on an underside of said locking lever and include at respective ends latches pointed at their ends in triangles for engaging in said anchoring apertures.

* * * * *